UNITED STATES PATENT OFFICE.

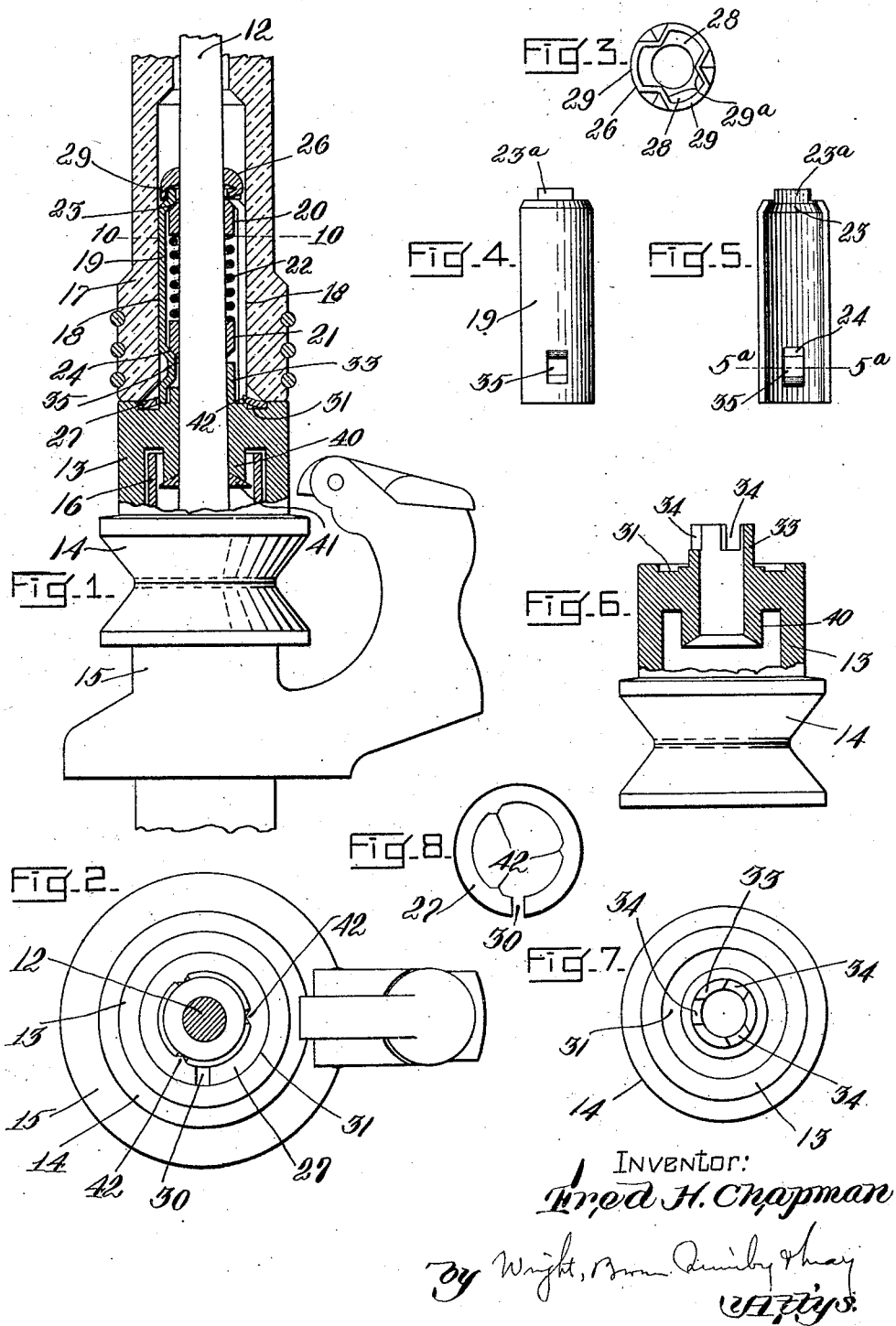

FRED H. CHAPMAN, OF PEPPERELL, MASSACHUSETTS.

SPINDLE.

1,406,975.  Specification of Letters Patent.  Patented Feb. 21, 1922.

Application filed July 22, 1920. Serial No. 398,240.

*To all whom it may concern:*

Be it known that I, FRED HILDRETH CHAPMAN, a citizen of the United States, residing at Pepperell, in the county of Middlesex and State of Massachusetts, have invented new and useful Improvements in Spindles, of which the following is a specification.

This invention relates to a spindle having a clutch to carry the bobbin in unison with the whorl and with the spindle blade, at exactly the proper height for the spinning or twisting of yarn, thread, etc.

Bobbin clutch spindles are in general use. Those heretofore constructed have certain defects and fail to carry the bobbin concentric and in unison with the blade.

In spindles of this type it is common to engage the spindle clutch with an internal clutch face formed in the bobbin. In some cases the spindle clutch has spring fingers that are compressed by the application of the bobbin. Clutches including such fingers are faulty, owing to the difficulty of manufacture and application of a spring that is concentric with the blade. When a clutch of this character, made and applied concentrically and with equal spring tension, carries a bobbin that is heavier on one side than at the opposite side, the high speed of rotation will throw the heavier side out of center by centrifugal force, until the tension on the opposite spring portion equals the weight and tension of the heavier side of the bobbin.

The same results occur with any elastic clutch, in which loose members are used, and centrifugal force is relied upon to throw out the clutch members and cause them to engage the bobbin. The hole in the standard bobbin does not allow space for loose clutch members with sufficient weight to function properly.

When clutch members are forced open at one end, in positive alinement with the blade, the contact with the bobbin is relatively small, so that when piecing up ends both in removing and applying the bobbin, the clutch is often revolved in the bobbin, wearing the bobbin at the point of contact. Owing to the grain of the wood this wear is unequal, so that after bobbins have been used for a considerable time, they run out of true at the clutch end, and in many cases the clutch reaches the limit of expansion, without clutching the worn portions of the bobbin.

Further, with this type, the entire clutch pressure, plus the friction of closing the clutch is exerted as the bobbin begins its traverse over the clutch, thus causing the clutch to chamfer the edge of the hole and putting considerable strain on the fulcrum and carrying point of the clutch members. In case of damage to a clutch member, the spindle must be taken from the frame and dismounted to insert another member.

The bobbin, as with all wood articles, is liable to warp, so that imperfections are caused, these being exaggerated by moisture and oil. The walls of the bobbin hole are often found to be out of parallel and out of line with the upper hole that fits the blade end.

With most constructions the whorl has to be shortened to make room for the clutch members, leaving an undesirably short bearing on the blade.

The object of my invention is to provide an improved clutch, obviating the above-mentioned and other objections heretofore experienced.

The invention is embodied in the several improvements which I will now proceed to describe and claim.

On the accompanying drawings forming a part of this specification,—

Figure 1 is a side elevation of a portion of the blade, and a portion of the whorl, showing in section another portion of the whorl, a portion of the bobbin, and a clutch embodying the invention.

Figure 2 is a plan view of the spindle, the blade being in section.

Figure 3 is a bottom plan view of the upper stop and clutch carrying member.

Figures 4 and 5 are respectively, outer and inner side views of one of the clutch members.

Figure 6 shows the whorl partly in section and partly in elevation.

Figure 7 is a top plan view of the whorl.

Figure 8 is a plan view of the lower stop member.

In the drawings, 12 represents a spindle blade, and 13 a whorl engaged with the blade, the whorl being provided with the usual pulley 14. The whorl and blade are supported by a suitable base 15, having an annular upper extension 16, projecting into the interior of the whorl. The upper end face of the whorl is formed as a seat for the base of the bobbin 17, and supports the members of the clutch hereinafter described.

My improved clutch is composed of a plurality of elongated clutch members 19, preferably three, grouped around a portion of the blade and collectively forming a male clutch adapted to engage a cylindrical internal clutch face 18 in the bobbin. Each clutch member 19 is movable throughout its entire length, in directions transverse, and preferably radial, to the axis of the blade 12, the lower ends of the members resting loosely on the upper end face of the whorl.

The clutch includes resilient expanding means organized to exert equal outward pressure simultaneously on opposite end portions of the members 19, and equally on all of said members, and thus press the members uniformly from end to end of their clutching surfaces against the internal clutch face 18, centering the bobbin. Said expanding means are preferably embodied in an upper collar or expander 20, having a conical face at its upper end, a lower collar or expander 21, having a conical face at its lower end, and a helical spring 22, interposed between the collars and pressing upon them. Each clutch member 19 is provided with an upper internal cam shoulder 23, bearing on the conical face of the upper collar 20, and with a lower internal cam shoulder 24, bearing on the conical face of the lower collar 21. Said collars are adapted to slide endwise on the blade, and being pressed apart from one another by the spring 22, their ends exert pressure simultaneously and equally on the internal shoulders 23 and 24 of all the clutch members. The opposite radial thrusts of the collars balance each other, and the cam or wedging effect of the clutch shoulders and the collars causes the clutch members to be moved outwardly. All of the clutch members being alike, the action is equal upon all; and they are thus caused to press equally upon the internal face of the bobbin, whereby they center the bobbin with respect to the spindle.

Associated with the spindle and clutch are stops which both prevent endwise movement of the clutch elements and retain said elements in their operative assemblage, limiting their movement outwardly from the blade.

I prefer to embody said stop means in an upper annular stop member 26, fixed to the blade 12, and cooperating with the outer ends of the clutch members, and a lower annular stop member 27, supported by the upper end face of the whorl, and cooperating with the inner ends of the clutch members. The upper stop 26 is a collar having radial guides 28 (Figure 3), and abutments 29 at the outer ends of said guides. The upper ends of the clutch members 19 are reduced in width, as shown by Figures 4 and 5, and are formed to slide in the guides 28, and to bear on the abutments 29 when at their maximum distance from the axis of the blade.

The lower stop 27 is a ring confined against edgewise movement by the whorl. The inner margin of said stop surrounds the lower ends of the clutch members, and constitutes an abutment on which said lower ends bear when at their maximum distance from the axis of the blade.

The ring forming the lower stop 27 is preferably detachably secured to the whorl, so that it is removable to permit the removal and replacement of the clutch members 19, without removing the spindle from the frame, or, in other words, while the spindle is in its operative position. To this end I cut said ring, as indicated at 30, (Figure 8), the ring being made of resilient metal, and insert it in an annular groove 31, in the outer end face of the whorl. The ring is dished or inclined upward from its outer to its inner margin, as shown by Figure 1, so that its inner margin is above the lower ends of the clutch members 19. The outer margin of the cut ring 27 is pressed by the resilience of the ring against the outer margin of the groove 31, so that the ring is confined against edgewise movement and may be easily pried out of the groove, and removed from the whorl and blade, leaving the lower ends of the clutch members unconfined.

The clutch is driven rotatably in part by the upper stop member 26, the guide elements of which bear on the confined reduced upper ends of the clutch elements, and in part by means on the wall engaging the lower end portions of the clutch members. The last named means are preferably constituted by a tubular extension 33 rising from the upper end of the wall and having notches 34. Into said slots extend inwardly projecting lugs 35, formed on the lower portions of the clutch members 19, so that the clutch members and whorl are interengaged to rotate together. The lugs 35 may be formed by pressing portions of the clutch members inwardly, as indicated by Figure 5, the inwardly pressed portions being shaped to provide the lower shoulders 24 above described.

It will now be seen that I have devised a clutch, the members of which are expanded equally from the blade from end to end, thus insuring the centering of the bobbin and the alinement of the clutch surfaces with the wall of the bobbin cavity with a given tension along the entire length of contact, thereby utilizing sufficient surface to render the wear negligible.

The clutch members have the capacity to align themselves individually with the hole of the bobbin, if the wall be deformed or out of parallel, or out of line with the top end of the bobbin, thereby bringing the average of a deformed hole true with the blade, that is, in alinement at a point midway the length of the clutch.

All of the clutch members are then forced outwardly to equal distances from the axis of the blade, due to the fact that all those parts of the expander cones which bear on the several clutch members are equally distant from this axis, and to the fact that such parts are incapable of any movement relatively to one another; that is, that each cone is a unit. The spring 22 may be made as powerful as desired, and preferably the force exerted by the spring through the cones, plus the frictional resistance to displacement of the cones under an inward radial pressure exerted through any single clutch member, is so great that centrifugal force due to lack of balance of the bobbin or eccentric disposition of its weight is not great enough to cause lateral displacement of the bobbin from its correctly centered position.

When the clutch enters the bobbin, the members close only at the upper end, therefore, the clutch is exerting much less than full pressure, so that much of the tendency to chamfer the bobbin is obviated.

The bobbin takes bearing directly over points where each clutch member has two individual bearings against cones, or conical faces that are always concentric with the blade.

The whorl is provided below its upper end face with a tubular projection 40, in alinement with and extending oppositely from the tubular projection 33. These projections and the intermediate portion of the whorl have a bore fitting the blade and extending below and within the upper extension 16 of the base, said bore being sufficiently elongated to insure a firm engagement of the whorl with the blade.

The usual oil stop 41 is fixed to the blade at a point within the whorl, and the tubular projection 40 is located above said stop.

The ring forming the lower stop member 27 may be provided with inclined projections 42, extending between adjacent edges of the clutch members 19, at the lower ends of said members, and constituting guards preventing yarn from working below the lower ends of the clutch members.

I claim:

1. A spindle and a clutch combined therewith; said clutch comprising elongated members arranged about the axis of said spindle and each being movable in directions transverse to such axis and prevented from moving around the axis, an expanding sleeve common to all of said members arranged as a wedge to exert outward pressure upon them and to slide lengthwise on the spindle, and constructed with positive pressure-applying portions through which such pressure is exerted and by which the movement of all the members away from said axis is made equal, and resilient means exerting force on said sleeve for the purpose set forth.

2. A spindle substantially as specified by claim 1, guard means being provided to prevent yarn from working below the lower ends of the clutch members.

3. A spindle substantially as specified by claim 1, means being provided for driving the clutch members in unison with the spindle.

4. A spindle substantially as specified by claim 1, the spindle and clutch members being provided with inter-engaging parts whereby the clutch members are driven in unison with the spindle.

5. A spindle substantially as specified by claim 1, means being provided for releasably securing the clutch members, whereby they may be removed and replaced while the spindle is in its operative position.

6. A spindle substantially as specified by claim 1, the said expanding means being also organized to permit a progressive contraction of the clutch, beginning at its outer end, whereby liability of chamfering the bobbin is minimized.

7. A spindle comprising a blade, a whorl, a male clutch associated with the blade and composed of elongated members, each movable throughout its entire length transversely to the axis of the blade, and provided with spaced apart internal cam shoulders, a pair of collars movable on the blade within said clutch, and contacting with said shoulders, a spring forcing said collars against said shoulders, whereby the members are crowded outwardly, and stop means organized to limit outward movement of the members.

8. A spindle comprising a blade, a whorl, a male clutch associated with the blade and composed of elongated members, each movable throughout its entire length in directions transverse to the axis of the blade, resilient expanding means organized to exert outward pressure at the same time on separated points of said members to force the members uniformly from end to end against a normal internal clutch face in a bobbin, an annular upper stop member fixed to the blade, and having guides arranged to guide the upper ends of said members in the directions set forth, and abutments for said upper ends, at the outer ends of said guides, and a lower stop member for limiting outward movement of the lower ends of said members.

9. A spindle substantially as specified by claim 8, the said lower stop member being separably engaged with the whorl to permit removal and replacement of the clutch members when the spindle is in its operative position.

10. A spindle substantially as specified by claim 8, the said lower stop member being provided with inclined projections located between the adjacent edges of the clutch members, at the lower ends of the latter, and constituting guards adapted to prevent yarn from working below the said lower ends.

11. A spindle comprising a blade, a whorl, provided with a tubular slotted projection, a male clutch associated with the blade above the whorl and composed of elongated members, each radially movable throughout its entire length, and provided with upper and lower internal cam shoulders, a pair of collars movable on the blade within said clutch, and contacting at their ends with said shoulders, a spring acting through said collars to exert radial outward pressure on said shoulders and thereby force the members uniformly from end to end against a normal internal clutch face in a bobbin, and stop means organized to positively limit radial outward movement of the members, the said lower internal shoulders being formed to enter the slots of the said tubular projection, and thereby cause the rotation of said clutch in unison with the whorl and blade.

12. A spindle comprising a blade, a whorl having an annular upper end face, provided with an annular groove surrounding the blade, a male clutch associated with the blade above the whorl, and composed of elongated members, each laterally movable throughout its entire length, automatic means acting to force said clutch members equally and uniformly away from the axis of the blade, an upper stop member fixed to the blade, and limiting outward movement of the upper ends of the clutch members, and a lower stop member composed of a resilient cut ring removably inserted in said annular groove, and releasably confined by the outer wall of the latter, said lower stop member limiting outward movement of the lower ends of the clutch members.

13. A bobbin clutch for spindles, comprising the combination with such spindle of clutch members spaced about the spindle in approximate parallelism therewith and being movable at all points inwardly and outwardly with respect to the spindle axis, an expander unit arranged to act as a wedge on all of said members, yielding means arranged to apply force to said expander unit, and means for limiting the outward movement of the members.

14. A bobbin clutch for spindles, comprising the combination with such spindle of clutch members spaced about the spindle in approximate parallelism therewith and being movable at all points inwardly and outwardly with respect to the spindle axis, an expander unit having wedging portions arranged at equal distances from the axis of the spindle in position to act on the several clutch members with tendency to force the latter outwardly when said expander unit is moved in one direction, yielding means arranged to apply force tending so to move said expander unit, and means for limiting the outward movement of the clutch members.

15. A clutch as set forth in claim 13 in which two expanders are provided and arranged to act on the clutch members near the opposite ends of the latter, respectively.

16. A clutch as set forth in claim 14, in which two expanders are provided, arranged to act on the clutch members near the opposite ends of the latter respectively, and the yielding means is applied to exert force equally on both expanders.

17. In combination, a fixed spindle base having an upper extension, and a spindle comprising a blade, a whorl and a yielding bobbin clutch associated with the blade, the whorl being provided with a tubular projection fitting the blade and extending below and within the upper extension of the base.

18. In combination, a fixed spindle base having an upper extension, and a spindle comprising a blade, a whorl and a yielding bobbin clutch associated with the blade, the whorl being provided with a tubular projection fitting the blade and extending below and within the upper extension of the base, the blade being provided with an oil stop, and the said tubular projection being located above said stop.

In testimony whereof I have affixed my signature.

FRED H. CHAPMAN.